United States Patent
Stefani

[19]

[11] Patent Number: 6,126,583
[45] Date of Patent: Oct. 3, 2000

[54] SUPPORTING STRUCTURE FOR PRODUCING ROLLERS COVERED WITH LAYERS OF ELASTIC SILICONE-BASED MATERIAL

[75] Inventor: Franco Stefani, Sassuolo, Italy

[73] Assignee: Syfal S.r.l., Sassuolo, Italy

[21] Appl. No.: 08/987,637

[22] Filed: Dec. 9, 1997

Related U.S. Application Data

[62] Division of application No. 08/396,387, Feb. 28, 1995, Pat. No. 5,736,089.

[30] Foreign Application Priority Data

Mar. 8, 1994 [IT] Italy ............................... MO94A0032
Mar. 8, 1994 [IT] Italy ............................... MO940010 U

[51] Int. Cl.⁷ ............................... B29C 41/04; F16C 13/00
[52] U.S. Cl. ............................... 492/31; 492/33; 492/36; 492/47
[58] Field of Search ............................... 425/130, 435, 425/425; 492/32, 47, 56, 60, 31, 33, 36; 29/805.32; 101/216, 367, 148

[56] References Cited

U.S. PATENT DOCUMENTS

| | | | |
|---|---|---|---|
| 2,541,531 | 2/1951 | Morris et al. ............................... | 264/71 |
| 2,752,632 | 7/1956 | Winstead ............................... | 18/10 |
| 3,529,054 | 9/1970 | Hepner ............................... | 264/261 |
| 3,539,671 | 11/1970 | Nauta ............................... | 264/102 |
| 3,561,059 | 2/1971 | Guldenfels . | |
| 3,607,494 | 9/1971 | Rowland ............................... | 156/86 |
| 3,634,578 | 1/1972 | Suzuki ............................... | 264/275 |
| 3,700,764 | 10/1972 | Tago ............................... | 264/273 |
| 3,737,963 | 6/1973 | Thermann et al. . | |
| 3,771,587 | 11/1973 | Poran ............................... | 164/282 |
| 3,805,738 | 4/1974 | Kitazawa ............................... | 118/227 |
| 3,816,582 | 6/1974 | Tennyson ............................... | 264/255 |
| 3,902,885 | 9/1975 | Rau ............................... | 65/302 |
| 3,956,448 | 5/1976 | Larson ............................... | 264/138 |
| 3,997,645 | 12/1976 | Dempster ............................... | 264/163 |
| 4,098,631 | 7/1978 | Stryjenski ............................... | 156/221 |
| 4,113,825 | 9/1978 | Hill et al. ............................... | 264/262 |
| 4,373,933 | 2/1983 | Grazen ............................... | 51/309 |
| 4,548,779 | 10/1985 | Steinberg et al. ............................... | 264/255 |
| 4,584,747 | 4/1986 | Katterbach et al. ............................... | 29/132 |
| 5,008,045 | 4/1991 | Manchak, Jr. et al. ............................... | 264/311 |
| 5,089,201 | 2/1992 | Takahashi ............................... | 264/135 |
| 5,110,382 | 5/1992 | Jerry et al. ............................... | 156/77 |
| 5,465,138 | 11/1995 | Jaskowiak et al. ............................... | 355/245 |

FOREIGN PATENT DOCUMENTS

| | | |
|---|---|---|
| 1 490 089 | 11/1967 | France . |
| 2 000 694 | 7/1970 | Germany . |
| 2003689 | 8/1970 | Germany . |
| 2 637 683 | 2/1978 | Germany . |
| 5016267 | 1/1993 | Japan . |
| 749 541 | 5/1956 | United Kingdom . |

*Primary Examiner*—John S. Hilten
*Assistant Examiner*—Leslie J. Grohusky
*Attorney, Agent, or Firm*—Guido Modiano; Albert Josif; Daniel Joseph O'Byrne

[57] ABSTRACT

A roller including an internal supporting structure and at least one layer of elastic silicone-based material attached to the supporting structure and forming a mirror-finished flexible outer surface of the roller. The supporting structure includes a central hollow perforated cylindrical body having a central axis and a pair of opposite ends; and a pair of end flanges attached to the cylindrical body at the opposite ends. Each of the pair of end flanges has outer circumferential surfaces which are raised with respect to the outer surface of the cylindrical body such that the supporting structure is removably insertable inside a hollow support-mold by having the outer circumferential surfaces engage with an inner surface of the support-mold for forming an interspace between the inner surface of the support-mold and the outer surface of the cylindrical body for containing elastic silicone-based material introducable from inside the supporting structure and through the perforated cylindrical body. At least one of the end flanges has an opening adapted for allowing the elastic silicone-based material to be introduced inside the supporting structure. The layer of elastic silicone-based material is attached to the outer surface of the cylindrical body.

6 Claims, 3 Drawing Sheets

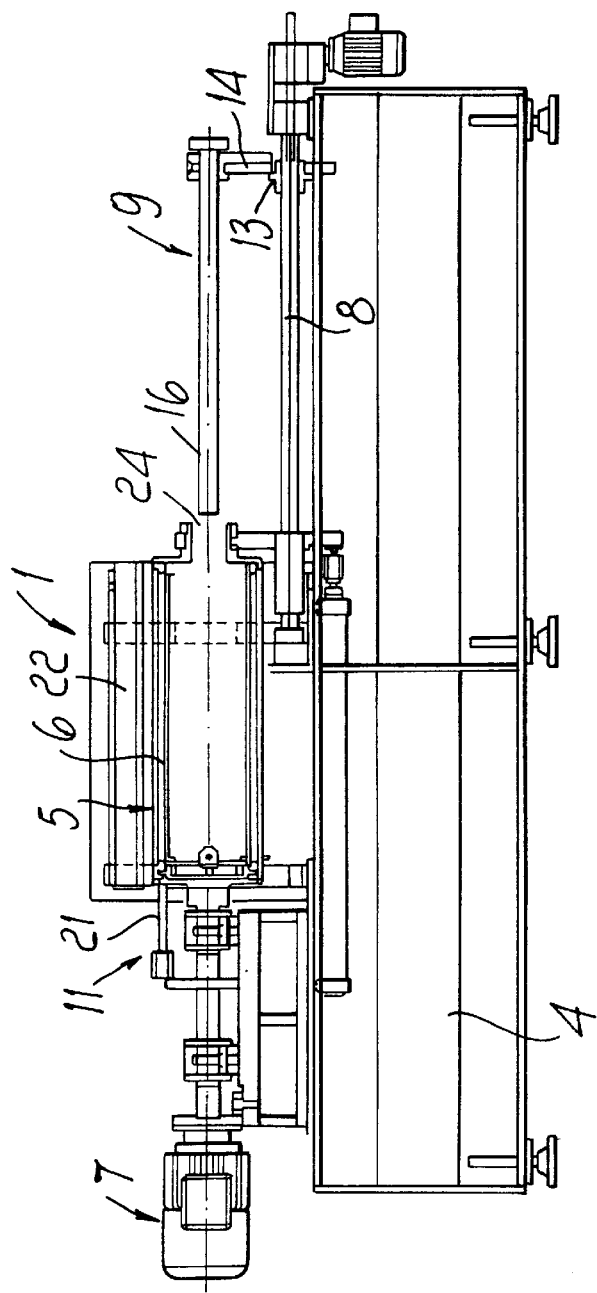
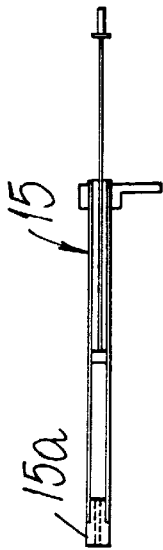
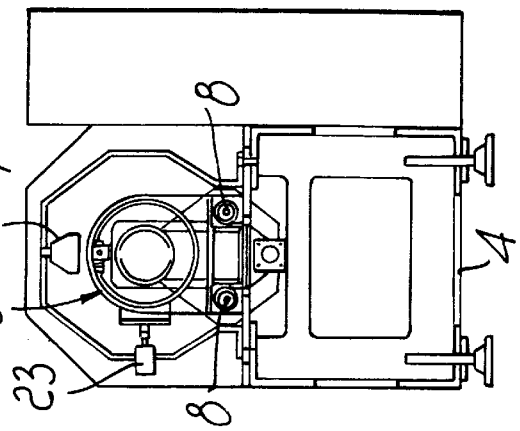

SUPPORTING STRUCTURE FOR PRODUCING ROLLERS COVERED WITH LAYERS OF ELASTIC SILICONE-BASED MATERIAL

This is a divisional application of Ser. No. 08/396,387 filed Feb. 28, 1995 now U.S. Pat. No. 5,736,089.

BACKGROUND OF THE INVENTION

The present invention relates to rollers covered with layers of elastic silicone-based material, and a support structure for such rollers.

Rollers made of silicone-based material have long been produced and used in printing by providing a matrix on their perimetric surface and by using the elasticity of their material to compensate for any microscopic bumps of the surfaces to which the print is to be applied.

Several other fields have long used rollers of various sizes which must have in common the characteristic of having an outer surface that is absolutely free from imperfections and is somewhat flexible to spontaneously adapt to the complementary surfaces with which they make contact; this is the case, for example, of rollers used as matrixes to decorate flat surfaces of products such as ceramic tiles.

Another field in which this type of roller is normally used is transport and conveyance in machines equipped with precision mechanics, such as photocopiers.

The above-mentioned decoration technique and precision in transport both require that the outer surfaces of the rollers on which the pattern to be printed is formed or on which the transported sheets rest, are smooth or indeed mirror-finished, so as to avoid any smudge or imperfection.

Accordingly, these rollers must have the smoothest possible lateral surface, with absolutely no imperfections and even mirror-finished and, as mentioned, substantially soft.

Said rollers are currently manufactured according to two basic methods: a first one consists in applying to a solid supporting cylinder strips of silicone rubber which are subsequently vulcanized; the surface thus obtained is then ground. A second process consists in pouring liquid degassed silicone into an openable cylindrical mold in which a support is placed; this is followed by a step for grinding the manufactured product.

However, both of the above described processes have drawbacks; in the first case it is impossible to obtain a surface that is sufficiently smooth, and mirror-finished; in addition said process requires onerous manual grinding operations during which the flexibility of the surface cannot drop below a certain value.

In the second case, only a single-layer covering can be obtained, and grinding is still necessary to eliminate the burr that forms in the points where the mold parts join.

Hence in both cases it is necessary to follow the actual covering step with the grinding step, and this entails a considerable waste of time and labor that negatively affects the production costs of the finished product.

Furthermore, the level of perfection that can be achieved with said grinding is still inadequate for the particular intended use of said rollers.

SUMMARY OF THE INVENTION

An aim of the present invention is to provide rollers particularly for printing covered with layers of elastic silicone-based material which are obtained in a fully automatic manner and without requiring grinding, and which have mirror-finished external surfaces in addition to a covering formed by multiple concentric layers that can be flexible according to the requirements.

In accordance with a preferred aspect of the invention, there is provided a roller including an internal supporting structure and at least one layer of elastic silicone-based material attached to the supporting structure and forming a mirror-finished flexible outer surface of the roller. The supporting structure includes a central hollow perforated cylindrical body having a central axis and a pair of opposite ends; and a pair of end flanges attached to the cylindrical body at the opposite ends. Each of the pair of end flanges has outer circumferential surfaces which are raised with respect to the outer surface of the cylindrical body such that the supporting structure is removably insertable inside a hollow support-mold by having the outer circumferential surfaces engage with an inner surface of the support-mold for forming an interspace between the inner surface of the support-mold and the outer surface of the cylindrical body for containing elastic silicone-based material introducable from inside the supporting structure and through the perforated cylindrical body. At least one of the end flanges has an opening adapted for allowing the elastic silicone-based material to be introduced inside the supporting structure. The at least one layer of elastic silicone-based material is attached to the outer surface of the cylindrical body.

Each of the end flanges may be provided with an inner annular groove in which a portion of the at least one layer of elastic silicone-based material is accommodated for attaching the at least one layer of elastic silicone-based material additionally to the end flanges.

The at least one layer of elastic silicone-based material may include an inner layer arranged in contact with the outer surface of the cylindrical body and an outer layer arranged surrounding the inner layer. The outer layer is preferably more rigid than the inner layer.

BRIEF DESCRIPTION OF THE DRAWINGS

Further characteristics and advantages of the invention will become apparent from the following detailed description of a preferred but not exclusive embodiment of an apparatus for producing rollers covered with layers of elastic silicone-based material, illustrated only by way of nonlimitative example in the accompanying drawings, wherein:

FIG. 1 is a front view of an apparatus for producing rollers covered with layers of elastic silicone-based material;

FIG. 2 is a side view thereof;

FIG. 3 is a detail view of means for introducing elastic silicone-based material;

DESCRIPTION OF THE PREFERRED EMBODIMENTS

Figure 4:
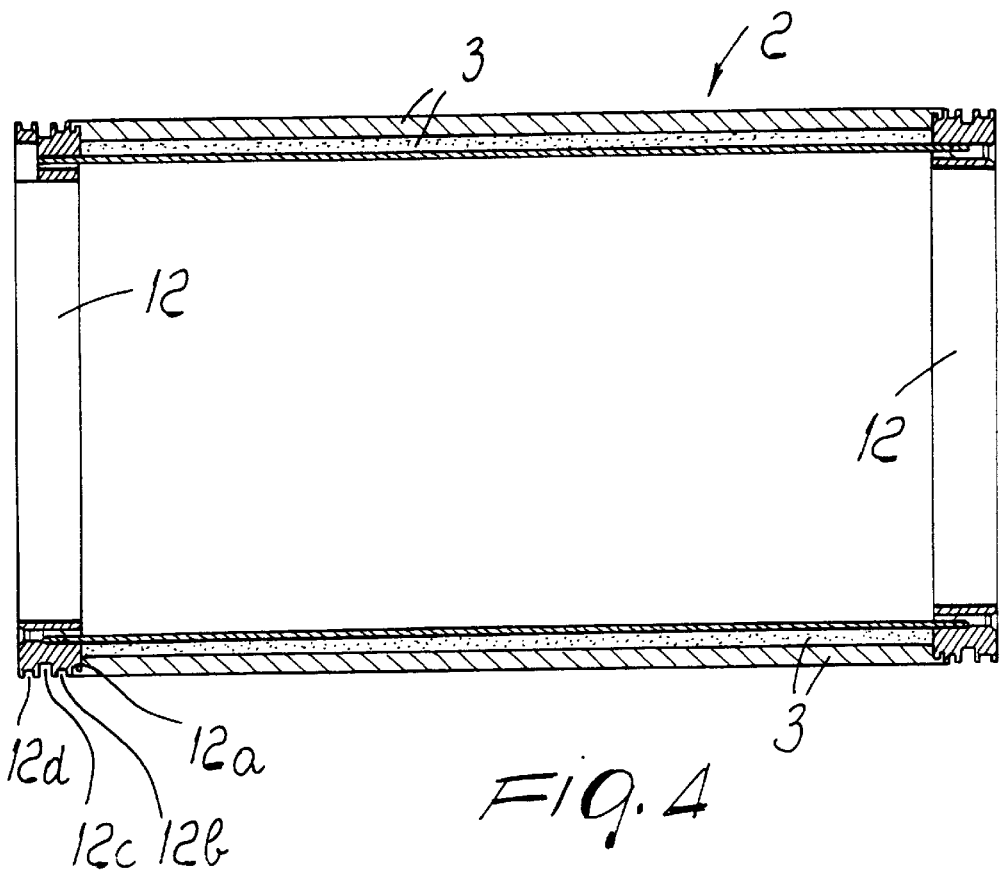
FIG. 4 is an enlarged-scale longitudinal sectional view of a roller obtained with said apparatus.
Figure 5:
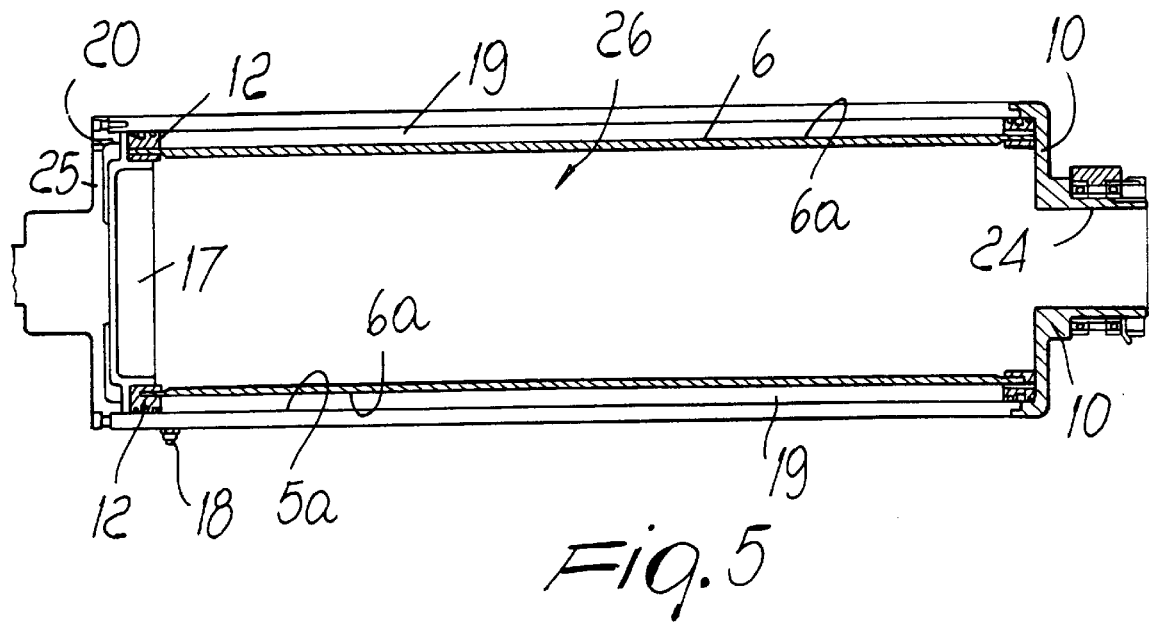
FIG. 5 is another longitudinal sectional view of a mold (or box-like support) inside which a supporting structure prepared to receive the covering is placed.

With reference to the above figures, the reference numeral 1 generally designates a machine or apparatus for producing rollers 2 with a cylindrical body covered with layers 3 of elastic silicone-based material; the machine comprises a base frame 4 on which a mold, or support, 5 is mounted; the mold has a box-like cylindrical body, and a prepared cylindrical supporting structure 6 coverable with elastic material which can be placed axially and snugly in said mold so as to provide a perimetric seal.

The mold 5 has means 7 which are adapted to make it rotate about its own longitudinal axis, and slides 8 are mounted respectively and bilaterally on its sides, and are supported by said base frame 4; said slides 8 guide the sliding of means 9 for introducing elastic silicone-based material inside an internal cavity 26 of the supporting structure 6 through an adapted opening 24 which is formed in a side of said structure 6 which is closed with a corresponding endplate 10; elements 11 for removing each covered roller 2 from the mold 5 are mounted on the opposite side.

The mold 5 is provided with conventional means for heating the covering of a finished roller 2 by irradiation.

Each supporting structure 6, prior to its insertion in the mold 5, is prepared: in practice, respective flanges 12 are applied in a conventional manner to the ends of the perforated and coverable cylindrical body; each flange 12 has, on its outer surface, a series of adjacent grooves which, if viewed from the inside towards the outside of the supporting structure, are in sequence: the groove 12a for engagement of the layer of elastic silicone-based material; the groove 12b for accommodating a first annular sealing gasket and for collecting printing ink during the use of the roller 2; the groove 12c for collecting the printing ink during use of the roller; and the groove 12d for accommodating a second annular sealing gasket and for collecting the printing ink; at least one reference notch, not shown in the drawings, is furthermore provided on each flange 12 to provide correct positioning.

Said means 9 for introducing elastic silicone-based material inside the supporting structures 6 are constituted by a carriage 13 which is movable back and forth along said slides 8 and on which carriage it is possible to mount alternately, along a horizontal axis that lies coaxially to the supporting structure 6 and after interposing a supporting and retention bracket 14, either a syringe 15 which is pre-loaded with said elastic silicone-based material or, when the filling material is depleted, a tubular element 16, one end thereof can be connected to a conventional machine for producing elastic foamed material (not shown); the opposite end can be inserted in each supporting structure 6 mounted on the mold 5 by moving said carriage 13.

The elements 11 for removing a covered roller 2 are constituted by a bottom 17 which is mounted hermetically, before insertion in the mold 5, at the end of a prepared supporting structure 6 on the side that lies opposite to the one from which material is introduced in the supporting structure, and by a valve element 18 of the one-way type which is mounted on said mold 5 and is adapted to connect to the outside the interspace 19 that remains between the internal surface 5a of said mold and the outer surface of the peripheral wall 6a of a supporting structure 6 which is arranged therein; the elements 11 also include a port 20 through which it is possible to insert a nozzle 21 for injecting a pressurized fluid; said port 20 is formed in the head wall 25 of the mold 5.

Figure 6:
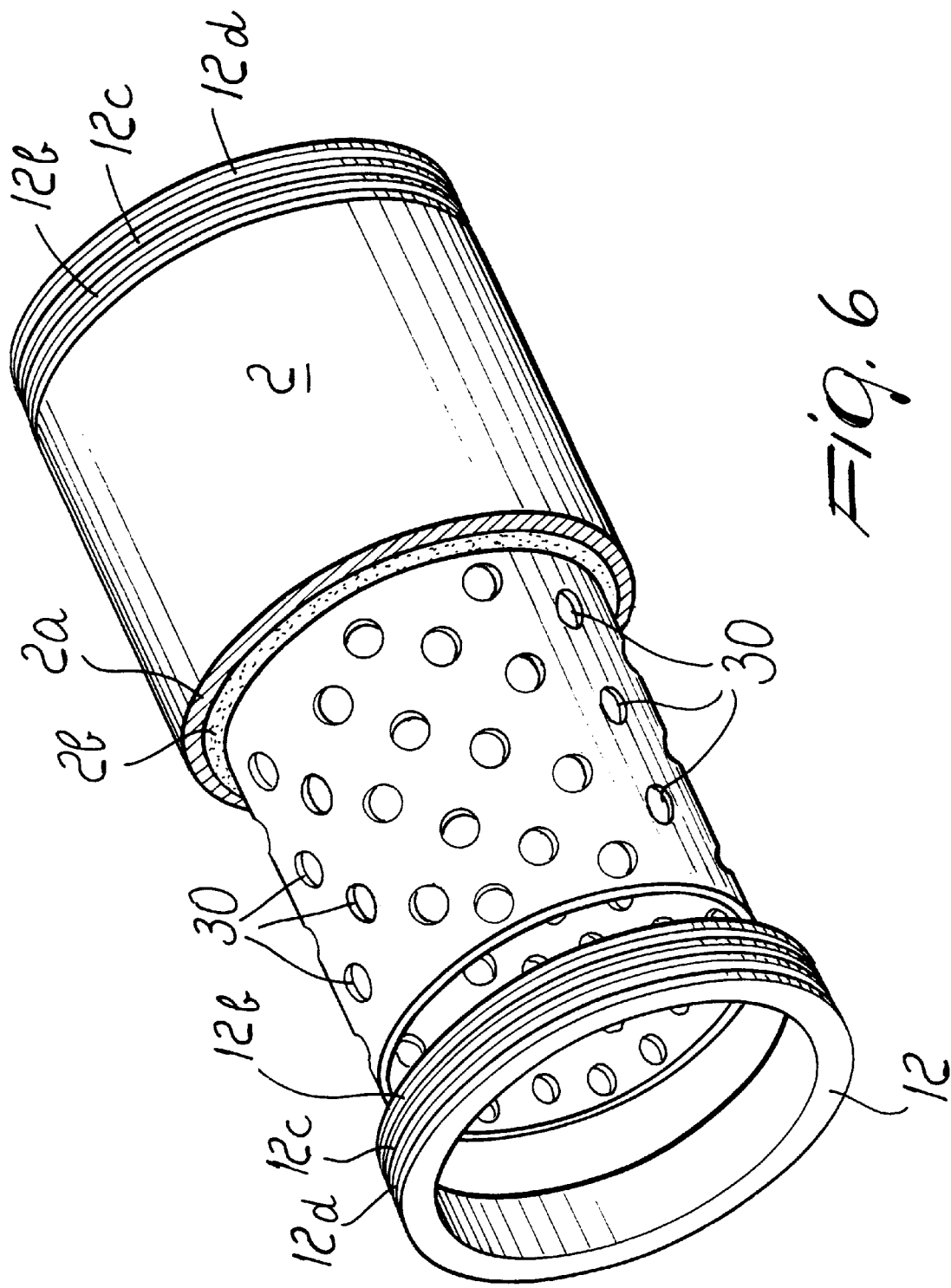
FIG. 6 is a perspective view of a roller, according to the invention and shown, for clarity, covered only partially by layers of elastic silicone-based material.

With reference to FIG. 6, the reference numeral 2 generally designates a supporting structure which can be covered with multiple layers 3 of material, usually constituted by silicone in the outside layer 2a and by foams of the same material in the inside layer 2b; the cylindrical supporting body 6 of said supporting structure is affected by multiple through openings 30 and is internally hollow.

If the finished roller is used for printing, respective flanges 12 as said can be applied to the ends of said cylindrical body 6 in a conventional manner, for example with screws; the perimetric surfaces of said flanges are crossed by a series of only three parallel grooves 12b, 12c, and 12d in which the outer grooves 12d are adapted to snugly temporarily accommodate respective annular gaskets which are not shown in the drawings as they are of a conventional type, the adjacent grooves 12c act as channel for collecting the excess ink during use of the finished roller for printing patterns, and the grooves 12b form a collar for grip on the covering 3. When said covering is completed on the body 2, said annular gaskets are removed and the grooves 12d and 12c also act as ink collectors.

The method for producing rollers covered with layers of elastic silicone-based material and the operation of the machine for carrying out the method are as follows: each supporting structure 6 is prepared by applying the two flanges 12 to the ends of the cylindrical body of said supporting structure, which is affected by a plurality of holes 30, and by mounting the corresponding annular gaskets (O-rings) in the appropriate grooves, respectively 12b and 12d, of said flanges; then one of the ends of the supporting structure 6 is closed by applying the bottom 17 thereto, and the entire assembly is inserted in the mold 5 by means of the thrust of the endplate 10, completing the first step of the method for positioning the prepared supporting structure.

Then the syringe 15 is loaded with the elastic silicone-based material, and a dispenser plug 15a, crossed centrally by a passage channel, is applied to the outlet of said syringe; said syringe is fixed to the carriage 13 by means of the bracket 14 and then inserted in the supporting structure 6, which has been set turning at a rate that is appropriate for the type of material to be injected.

The plunger of the syringe 15 is locked in position in a conventional manner, and a command sent by a computer that controls the entire operation of the machine causes the carriage 13 to retract, expelling the material from the syringe; said material is distributed along a helical path inside the supporting structure 6, and the second step of the method is thus completed.

The empty syringe is removed from the bracket 14 and the tubular element 16 is mounted in its place.

At the same time, in a third step, the mold 5 is made to rotate very rapidly, and due to the centrifugal force, the elastic silicone-based material passes through the holes 30 of the peripheral wall surface 6a of the supporting structure 6 and distributes over the outer surface of said supporting structure, creating a uniform layer without air bubbles. The fourth step is completed by reducing the rotation rate of the mold 5 and by activating the set of resistors 22, polymerizing the layer of material thus formed on the surface of the supporting structure 6.

By using the same technique used for forming the first layer 2a, the tubular element 16, which is connectable to a conventional machine that produces a foam of elastic silicone-based material more elastic than the previous composition, forms the additional underlayers 2b from the inside of the supporting structure 6; said underlayers 2b are therefore more yielding and elastic as they are constituted by foams and thus by materials with a high percentage of empty space, as expressly required for the use of the finished rollers 2.

When the various layers made of elastic silicone-based material or constituted by foams have been completed, the fifth step is performed; in this step, the finished roller 2 is removed from the mold 5 inside which it is firmly seated due to the adhesion between the contiguous walls, which are in mutual contact.

A liquid is forced, for example by means of a pneumatic cylinder 23, through the one-way valve element 18 in order to separate said walls; said liquid is arranged in a thin layer between said walls and fully separates them when the mold 5 is rotated at high speed for a given time.

An additional injector nozzle 21 injects pressurized air inside the mold 5 through the port 20, acting on the bottom 17 and pushing the finished roller 2 towards the outside of said mold; said roller is thus ready to be etched and used for printing, since its outer surface is smooth to the point of being mirror-finished and has a certain elastic rigidity and a substantially resilient substrate, also in an elastic manner in order to absorb, during use, any nonuniformities of the complementary surfaces with which it makes contact.

More than one outer layer and inner layer may be provided, according to the requirements, simply by repeating the steps for distribution and for rotating the supporting structure.

In practice it has been observed that the described invention achieves the intended aim and objects.

The invention thus conceived is susceptible of modifications and variations, all of which are within the scope of the inventive concept.

All the details may furthermore be replaced with other technically equivalent elements.

In the practical embodiment of the invention, the materials used, as well as the shapes and dimensions, may be any according to the requirements without thereby abandoning the protective scope of the claims that follow.

What is claimed is:

1. A supporting structure which is coverable with multiple concentric layers of elastic silicone-based material for obtaining a roller having a mirror-finished flexible outer surface, said supporting structure comprising:
   a cylindrical supporting body, said cylindrical body being internally hollow to form an internal cavity and having a peripheral wall that is perforated by a plurality of through openings, said openings being variously distributed and shaped in a plan view to allow passage of elastic silicone-based material, introduced in the internal cavity, from said cavity onto an outer surface of said peripheral wall and to provide engagement therewith, said elastic material being passed from said internal cavity to said outer surface by centrifugal force acting on said cylindrical body;
   respective annular flanges applied to opposite ends of said cylindrical body, said flanges being detachably secured to said cylindrical body;
   and a plurality of adjacent concentric grooves provided at each perimetric surface of said flanges, wherein said plurality of concentric grooves include outer grooves for accommodating respective annular gaskets that provide perimetric seal, middle grooves adapted for collecting ink during use of the roller for printing, and inner grooves forming an engagement collar for said elastic material.

2. The supporting structure of claim 1, further comprising, at a first one of said ends of the cylindrical body, an end plate which closes at said first end said internal cavity, said end plate being provided with an axial inlet opening that allows injection of said elastic material inside said internal cavity.

3. The supporting structure of claim 2, further comprising a bottom element which is hermetically mountable at a second one of said ends of the cylindrical body, opposite to said first end provided with said end plate.

4. A supporting structure for supporting multiple concentric layers of elastic silicone-based material so as to form a roller having a mirror-finished flexible outer surface, the supporting structure comprising:
   a central hollow perforated cylindrical body having a central axis and a pair of opposite ends; and
   a pair of end flanges attached to said cylindrical body at said opposite ends, each of said pair of end flanges having outer circumferential surfaces which are raised with respect to the outer surface of said cylindrical body such that said supporting structure is removably insertable inside a hollow support-mold by having said outer circumferential surfaces engage with an inner surface of said support-mold for forming an interspace between the inner surface of said support-mold and the outer surface of said cylindrical body for containing elastic silicone-based material insertable from inside said supporting structure and through said perforated cylindrical body, at least one of said end flanges having an opening adapted for allowing the elastic silicone-based material to be introduced inside said supporting structure; and
   wherein each of said end flanges is provided with an inner annular groove which communicates with said interspace when said supporting structure is inserted in said support-mold for allowing the elastic silicone-based material to be introduced in said inner annular groove for connecting the elastic silicone-based material to said supporting structure, and with at least one annular groove in which a sealing O-ring is accommodatable for creating a seal between said end flanges and the inner surface of the support-mold when said supporting structure is inserted in said support-mold.

5. The supporting structure of claim 4, further comprising, at a first one of said ends of the cylindrical body, an end plate which closes at said first end said internal cavity, said end plate being provided axially with said opening adapted for allowing the elastic silicone-based material to be introduced inside said supporting structure.

6. The supporting structure of claim 5, further comprising a bottom element which is hermetically mountable at a second one of said ends of the cylindrical body, opposite to said first end provided with said end plate.

* * * * *